(12) United States Patent
Suriano

(10) Patent No.: US 7,667,120 B2
(45) Date of Patent: Feb. 23, 2010

(54) TRAINING METHOD USING SPECIFIC AUDIO PATTERNS AND TECHNIQUES

(75) Inventor: Art Suriano, Newton, NJ (US)

(73) Assignee: The TSi Company, Newton, NJ (US)

( * ) Notice: Subject to any disclaimer, the term of this patent is extended or adjusted under 35 U.S.C. 154(b) by 97 days.

(21) Appl. No.: 11/693,965

(22) Filed: Mar. 30, 2007

(65) Prior Publication Data

US 2007/0227339 A1     Oct. 4, 2007

Related U.S. Application Data

(60) Provisional application No. 60/743,952, filed on Mar. 30, 2006.

(51) Int. Cl.
*G09B 25/00* (2006.01)
(52) U.S. Cl. ............................ 84/600; 84/601; 434/365
(58) Field of Classification Search ........... 84/600–602; 434/365
See application file for complete search history.

(56) References Cited

U.S. PATENT DOCUMENTS

| | | | | |
|---|---|---|---|---|
| 3,823,637 A * | 7/1974 | Scott | ........................ | 84/470 R |
| 4,012,848 A * | 3/1977 | Diament et al. | ......... | 434/307 R |
| 4,037,332 A * | 7/1977 | Petrusinsky | ............. | 434/307 R |
| 5,513,991 A * | 5/1996 | Reynolds et al. | .............. | 434/81 |
| 5,585,583 A * | 12/1996 | Owen | ........................ | 84/470 R |
| 5,741,136 A * | 4/1998 | Kirksey et al. | .............. | 434/169 |

(Continued)

OTHER PUBLICATIONS

5566 Cooking. ( http://www.youtube.com/watch?v=UxatT3jcQMw dated Dec. 24, 2009). viewed on May 21, 2009.*

*Primary Examiner*—David S. Warren
(74) *Attorney, Agent, or Firm*—Richard C. Woodbridge; Fox Rothschild LLP

(57) ABSTRACT

A method is disclosed that utilizes specific techniques, based upon empirical study, to significantly increase the ability of a trainee to remain focused on the training materials and subject matter and actually learn and retain the training subject matter. More specifically, the present invention utilizes audio and/or visual (e.g., a personal computer) elements, with a strict set of rules which must be followed regarding sentence length, narrators, and underlying music within the dialog to create a specific rhythmic "feel" to the training. As a result of using such techniques, significantly improved results over prior art training methods can be obtained.

6 Claims, 13 Drawing Sheets

U.S. PATENT DOCUMENTS

| | | | | |
|---|---|---|---|---|
| 5,810,599 | A * | 9/1998 | Bishop | 434/157 |
| 5,835,667 | A * | 11/1998 | Wactlar et al. | 386/96 |
| 5,915,237 | A * | 6/1999 | Boss et al. | 704/270.1 |
| 5,938,447 | A * | 8/1999 | Kirksey | 434/169 |
| 6,007,228 | A * | 12/1999 | Agarwal et al. | 700/94 |
| 6,155,834 | A * | 12/2000 | New, III | 434/118 |
| 6,293,802 | B1 * | 9/2001 | Ahlgren | 434/252 |
| 6,374,148 | B1 * | 4/2002 | Dharmarajan et al. | 700/94 |
| 7,618,347 | B2 * | 11/2009 | Yeo et al. | 482/8 |
| 2001/0039571 | A1 * | 11/2001 | Atkinson | 709/217 |
| 2001/0053996 | A1 * | 12/2001 | Atkinson | 705/14 |
| 2002/0165880 | A1 * | 11/2002 | Hornsby et al. | 707/517 |
| 2003/0003433 | A1 * | 1/2003 | Carpenter et al. | 434/323 |
| 2003/0039947 | A1 * | 2/2003 | Arlinsky | 434/308 |
| 2003/0041066 | A1 * | 2/2003 | Stanfield et al. | 707/100 |
| 2003/0046186 | A1 * | 3/2003 | Wren | 705/27 |
| 2003/0125823 | A1 * | 7/2003 | Abe et al. | 700/94 |
| 2004/0004665 | A1 * | 1/2004 | Kashiwa | 348/239 |
| 2004/0163107 | A1 * | 8/2004 | Crystal | 725/32 |
| 2004/0175689 | A1 * | 9/2004 | Watanabe et al. | 434/365 |
| 2004/0248068 | A1 * | 12/2004 | Davidovich | 434/157 |
| 2005/0050168 | A1 * | 3/2005 | Wen et al. | 709/219 |
| 2005/0095569 | A1 * | 5/2005 | Franklin | 434/350 |
| 2005/0255430 | A1 * | 11/2005 | Kalinowski et al. | 434/169 |
| 2006/0034583 | A1 * | 2/2006 | Shimizu | 386/46 |
| 2006/0169125 | A1 * | 8/2006 | Ashkenazi et al. | 84/612 |
| 2007/0026958 | A1 * | 2/2007 | Barasch et al. | 473/266 |
| 2007/0099163 | A1 * | 5/2007 | Tseng | 434/350 |
| 2007/0192370 | A1 * | 8/2007 | Kim et al. | 707/104.1 |
| 2008/0070203 | A1 * | 3/2008 | Franzblau | 434/157 |
| 2008/0097948 | A1 * | 4/2008 | Funge et al. | 706/47 |
| 2008/0140414 | A1 * | 6/2008 | Hejna | 704/270 |
| 2008/0212176 | A1 * | 9/2008 | Baun et al. | 359/429 |
| 2008/0247458 | A1 * | 10/2008 | Sun et al. | 375/240.01 |
| 2008/0261189 | A1 * | 10/2008 | Katayama | 434/257 |
| 2009/0099983 | A1 * | 4/2009 | Drane et al. | 706/12 |
| 2009/0170057 | A1 * | 7/2009 | Yu et al. | 434/308 |

* cited by examiner

TRAINING METHOD USING SPECIFIC AUDIO PATTERNS AND TECHNIQUES

CROSS-REFERENCE TO RELATED APPLICATIONS

This application is based on and claims priority to U.S. Provisional Application No. 60/743,952, filed Mar. 30, 2006, the entire contents of which is fully incorporated hereby by reference.

BACKGROUND OF THE INVENTION

Training has become a significant industry throughout the world. For any type of learned skill, there are live seminars, audio and video presentations, and computer programs available to assist a person in developing those skills.

Many of the training techniques used, while marginally effective, can tend to be boring and can lose the focus of the trainee. With the advent of audio/visual technology, training tools such as Microsoft® PowerPoint® have been developed in an attempt to keep the interest of the trainee. PowerPoint® offers the trainer the ability to transition slides and use multiple colors, photographs, sounds, videos and the like during part of the training presentation. While tools such as this can successfully achieve the goal of keeping the interest of the trainee, as anyone who has sat through a training seminar or training program of any type can attest, there is significant room for improving the methods by which training is presented.

SUMMARY OF THE INVENTION

The present invention utilizes specific techniques, based upon empirical study, to significantly increase the ability of a trainee to remain focused on the training materials and subject matter and actually learn and retain the training subject matter. More specifically, the present invention utilizes audio and/or visual (e.g., a personal computer) elements, with a strict set of rules which must be followed regarding sentence length, narrators, and underlying music within the dialog to create a specific rhythmic "feel" to the training. As a result of using such techniques, the Applicant has found significantly improved results over prior art training methods.

DETAILED DESCRIPTION OF THE PREFERRED EMBODIMENTS

Figure 1A:
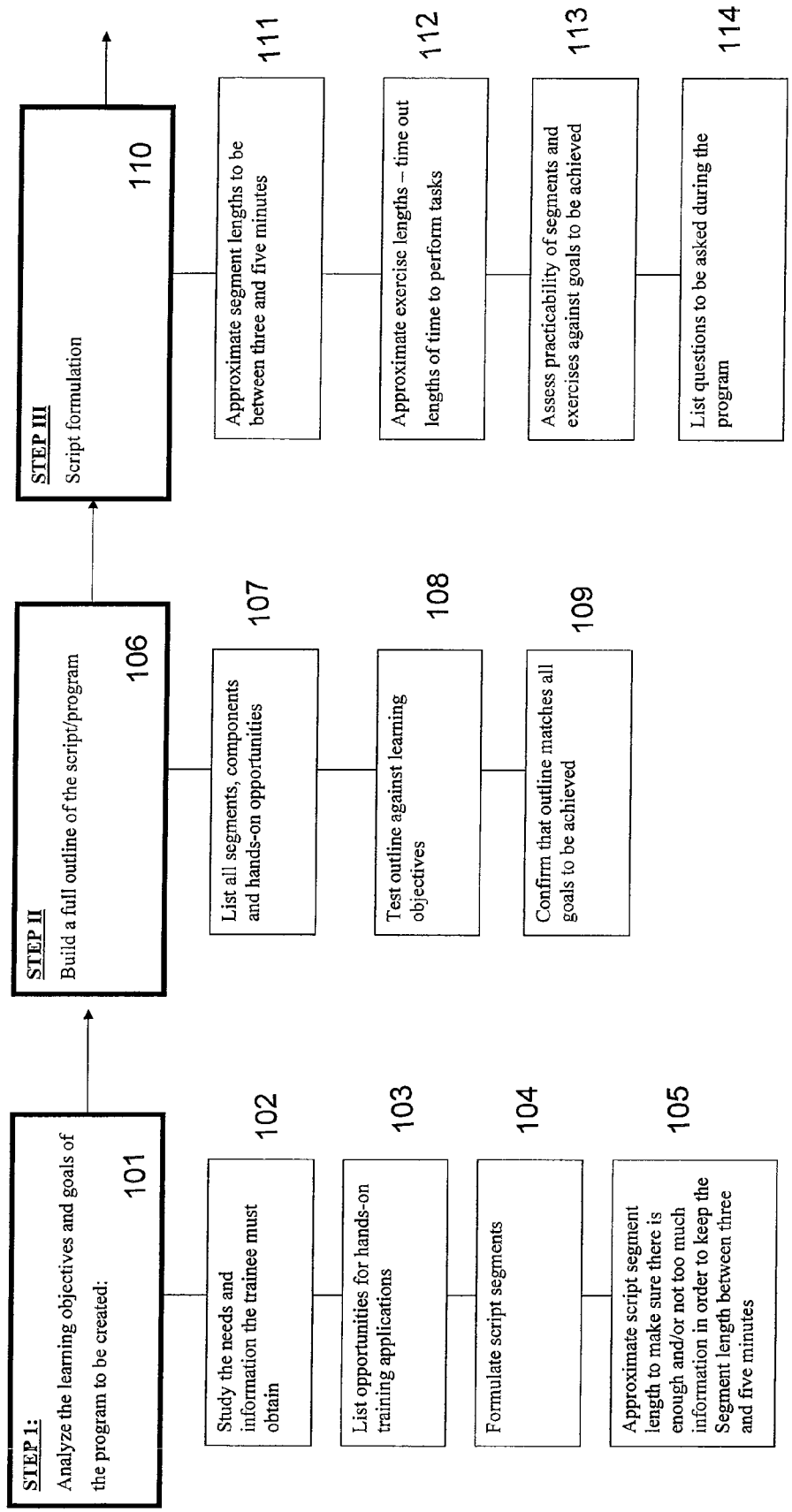
FIGS. 1A-1F illustrate a flowchart describing steps performed in creating an audio-based logical training program in accordance with the present invention.

The present invention, referred to herein as "logical training", is a proven training method that allows a trainee the opportunity to learn "by doing" without significant reading or writing. It is a formula based method with custom written dialogue, custom scored music, testing and measuring results. A benefit of logical training is that it combines auditory, visual, tactile and kinesthetic learning styles into one program. It is used to teach trainees how to perform specific functions, such as how to operate equipment, sell merchandise, and use computer software. The method is a self-paced teaching style allowing trainees to train on their own, at their own pace using hands-on applications, with little reading and no writing. When necessary, programs can be bi-lingual. This method of training is most useful in the business community where the cost of training is high, time is limited and there is insufficient availability of trainers. Logical training can help businesses train their employees in a variety of ways inexpensively, efficiently and quickly.

In preferred embodiments, logical training programs can be delivered in two platforms: Audio based and PC based. In both platforms, audio is the main source of delivering the information to the trainee. A major component of logical training is making the training compartmentalized, fun, easy-to-use and enjoyable, resulting in a very high retention rate. A specific style and method, defined in more detail below, is used in every logical training program. This is achieved with carefully designed scripts and the use of custom created music. The script is recorded with multiple announcers, which makes the program easier to listen to. This is because the ear is constantly adjusting to the different sounds of the announcer voices, an element that has been found to decrease the likelihood that the trainee will be distracted.

The custom underscoring music is composed purposely to contain no melodic passages, but with strong focus on rhythmic and harmonic structures. The combination of this specific rhythmic/harmonic structure and specific parameters regarding the narrative being delivered over the rhythmic/harmonic structure, significantly increases the retention of information by the trainees. In accordance with the present invention the announcers speak at a specific pace, which is quick enough to keep the listener attentive but slow enough so that the information can be absorbed. The music tempo is selected to match the pace of the dialogue.

During the script writing process, the script is divided into multiple segments. Each segment contains: information to be delivered, review sections, and questions asked that must be answered by the trainee. Each segment length is kept under 5 minutes. By using review sections followed by questions in the scripts, learning breaks are created allowing scripts to be thirty minutes in length without the trainee becoming bored, pre-occupied or losing interest. In addition to the short exercises that trainees will perform while hearing music underscore, throughout each program there are also several "Stop and Start" sections where the trainee will hear instructions to stop the program, perform a specific exercise, then start the program when they are ready to continue. The exercises given in a "Stop and Start" section are considerably longer than the short exercises that contain music underscoring. These longer exercises are often completed in different lengths of time depending on the abilities of the trainee. The logical training method of the present invention allows for this by keeping these exercises self-paced.

Trainees preferably listen to the audio through headsets. This makes it easier for the trainees to comprehend the program without distraction. Audio delivered logical training programs preferably place the trainee in front of whatever they need to learn, in all cases wearing a headset or headphones. For example, if the trainee is to learn how to operate a piece of equipment, the trainee is situated with the equipment, headphones on, and is taught how to operate it. If the trainee is to learn software, they sit at the computer while wearing the headset. If the trainee is learning how to sell merchandise, they are located in the area in the store where the merchandise is contained, in front of the physical merchandise, and the training materials are delivered via the headset.

Programs delivered on PC can use a specially-designed, easy-to-use, custom interface with simple navigation. A most important element to a logical training program delivered via PC is the construction of the program itself. The program is broken into segments that match the audio components. Trainees will watch visuals on screen while listening to the recorded dialogue with specialized musical underscoring as described generally above and more specifically below. The visuals use mostly pictures, quick diagrams, and key words and minimize or, ideally, completely avoid, the need to read lengthy passages. PC delivered programs are designed to have the trainee begin training at a PC terminal. At a particular part of the program where hands-on opportunities exist, the trainee is directed to take a portable medium on which the program is stored (preferably the same medium being used by the computer to retrieve the PC-delivered component of the training, e.g. a CD-ROM disc on which the computer program is stored) and use it with an audio device (e.g., a portable CD player) with a headset, and is directed to go to the station where the training will be continued. Once the hands-on applications are completed, the trainee is instructed to return to the PC terminal and to place the storage medium back into the computer for the training to be completed.

This process can also be accomplished when the program is delivered via the web and there is no CD or other portable medium available on which the computer software is stored. In this situation, an accompanying portable audio device such as a CD Player, MP3 player, IPod etc, is provided to the trainee, with the appropriate audio information, to be used at the times when the PC training program instructs the trainee to engage in a hands-on task. Once the task is completed, the trainee can simply turn the accompanying portable audio player off and continue the PC training. PC logical training programs can also be provided on hand-held multimedia devices that have audio/video capability. When this occurs, the trainee uses one piece of equipment for the entire training. (When applicable, logical training PC programs can be integrated with existing Learning Management Systems which allows others such as management to easily obtain test scores and results.)

A complete software program for downloading both audio as well as PC programs, either hand-held or CD-ROM based, has been developed by the applicant. With the use of dedicated IP address, users of the logical training method of the present invention can simply log on to an external website where they can easily download the most current version of their training programs. The portable devices can be loaded through a USB connector on their PC terminal. For larger corporations, the IT or MIS department is granted permission to connect to a dedicated IP address manually or via dedicated computer scripting on a regular or semi-regular basis. The IT or MIS department downloads the updated or new program(s) into their server, and then sends it through their intranet to the various locations for the end user to download into the portable device. Proprietary software can be provided allowing an icon to appear on the PC terminal that connects the user directly with the programs to be downloaded. Each program is clearly identified for easy downloading selection. In addition, the software automatically checks for updates to any program(s) already loaded onto the handheld device that have been updated since the unit was last connected to the terminal. The custom software is cross platform and can be easily modified for the end user's specific needs.

Following are examples illustrating specific criteria to be used in accordance with the present invention. It is understood that while use of all of the following criteria simultaneously will result in the most beneficial training, individual aspects of the present invention utilized separately may also result in substantial benefits of the prior art.

Formula:

Script:

The script must apply step-by-step instruction as follows:

1) Develop fall outline of program

2) Following the outline, begin with an introduction that briefly explains the program, the objectives, what will be learned and how the trainee will be tested. This section should be no longer than 60 seconds.

3) Develop script modules as follows:

a. Information—introduce a section of new information and provide an overview with explanation. This section is not to be longer than five minutes b. Review—review the information and state the task that will be performed. This section is to be no longer than two minutes.

c. Task to be performed—give instructions to the task and have it performed. The instructions provided section is not to exceed one minute. The task has no specific time limit because the program exercises are self-paced. However, the length of the exercise should be kept to a minimum so that program continuity is maintained. Any task to be performed that will take longer than three to five minutes should be divided into two tasks whenever possible.

d. Review of task—review the task to make sure it was completed correctly. This section is not to be longer than two minutes.

e. Questions—Ask trainee two questions to be answered at the end of each segment, give approximately twenty seconds for the trainee to answer the question. On the "Audio Only" version, trainee uses an "Answer Page" which is a pre-printed paper with the number of each question on the page. The questions themselves are not printed and are only 'heard' through the logical training program. Next to each question number are the letters A, B and C. The trainee is instructed to circle the correct letter for each question asked. On a PC delivered program, questions are asked at the terminal, and with the mouse the trainee selects the correct answer.

4) Make sure the script is written for at least two announcers speaking alternately. Each announcer is limited to no more than (2) sentences or 10 seconds of speaking at a time, whichever is less. The purpose is to keep the listener focused.

5) Script must be written in "normal everyday speaking" language and allow for the announcers to easily speak within a tempo range of 110-152 beats per minute. Normal everyday speaking language is defined as talking rather than reading. For example, in most cases use contractions such as "can't" instead of "cannot," etc. Also, modern day phrases should be incorporated such as "Check out", "Way to Go," "That's Awesome," etc., to keep the program more upbeat and positive.

Music:

Rules for Music "Soundbed" Composition:

1) Tempo must be no slower than 110 beats per minute and no faster than 152 beats per minute.

2) There are three primary drum rhythm patterns all in 4/4 time. The kick drum can use these patterns as follows:

a. 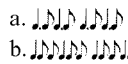

b. 

c. 

With each pattern the snare drum maintains strong down beats on the second and fourth beat of each measure as follows:

a. 

The high-hat can be all eighth notes for the slower tempos and all quarter notes for the faster tempos as follows:

a. 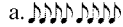
b. 

The high-hat may also be altered to accommodate a triplet feel with the kick drum utilizing a dotted quarter/eight not triplet feel, the snare still maintaining a heavy 2 and 4 and the high-hat playing eight note triplets as follows:

|   | 3 | 3 | 3 | 3 |
|---|---|---|---|---|
| c. |  |  |  |  |

Note: When creating Light Jazz (Swing style music) a dotted feel is acceptable for the high-hat as follows:

d. 

3) Music should be 70% major key compositions and only 30% minor key composition 4) The duration of a music "soundbed" should be no more than 90 seconds.

5) "Soundbeds" cannot have "key" modulations

6) All music composed must be in groups of 8, 16 or 32 bar phrases

7) All music composed must follow these music forms:

| a. | A |
| b. | ABA |
| c. | AABA |

8) The end of each phrase must return to the tonic chord or the dominant chord only when the phrase will be repeated, as in an AABA form.

9) There is to be no melody and no melodic passages. (Melody of any type will distract the listener).

10) Music "soundbeds" must have energy, strong rhythm, not be too slow (less than 110 beats per minute), and they should be musically simple, meaning limited use of flatted or diminished chords, multiple clashing motifs, and not generally dissonant (unpleasant) to the ear.

11) All music beds must have a definite ending which is usually a resolved tonic chord on either beats one, three or four of the last measure. There cannot be any fade-outs, or long ending chords with decay.

12) All music written is to have a "happy" feel with a sense of being "pleasant" and "lighthearted."

Acceptable Music Styles:

There are four basic styles of music "soundbeds" that are acceptable:

1) Rock'n Roll Beds
2) Light Jazz Beds
3) Groove Beds
4) Light/Adult Contemporary Rules as Follows:

Rock'N Roll Beds a. "Soundbed" composition must maintain strong use of "major" chords.

b. Electric guitars should use "power" chords (heavy sounding chords with a distortion guitar sound).

c. Electric guitars may also use "muted" notes (Clean guitar sound playing one or two notes with the strings muted by the right hand).

d. All other music composition rules above apply.

Light Jazz Beds:

a. Use of minor seventh and minor ninth chords is acceptable, but must not be too dissonant (unpleasant to the ear).

b. Bass must follow straight quarter note walking.

c. Piano is to be simple, with right hand chords sustained using half and whole notes mixed with light rhythm but nothing complex. Piano not to use any jazz riffs, fast moving passages or heavy rhythms, as they can easily draw attention away from the speaker. Left hand should be kept simple playing only root on inversion of chord or doubling the bass.

Chords are to be a mixture of light jazz (7th's and 9th's both major and minor) and non-jazz chords. For example:

Fmaj7-Gm9-Fmaj7-Gm7-BbMaj7-Am7-BbMaj7-C

A chord progression using a pattern like this is for an AABA form where the A is repeated is acceptable.

d. Strong swing "dotted note" rhythm with energy is required.

e. Tempos to stay within 110-132 beats per minute.

f. All other music composition rules above apply.

Groove Beds:

a. "Soundbed" to have strong rhythmic groove with a definite pulse. Bass rhythmic pattern to be in sync with kick drum.

b. Use of light synthesizer "sound pads" is acceptable.

c. No dissonant sounds or anything unpleasant to the ear.

d. Use of light ostinato parts, such as muted guitar notes, synthesizer single note phrases or short multiple note phrases are acceptable provided they are not too prominent or distracting.

e. All other music composition rules above apply.

Light/Adult Contemporary:

a. "Soundbeds" are written in only major keys.

b. Tempos between 132-152 beats per minute.

c. Use of simple pattern chord phrases that use mostly major chords with some minor chords added. For example here is an acceptable 16 bar chord progressions:

A-F#m-D-A-D-A-Bm-E-A-F#m-D-A-D-A-E-A d. All other music composition rules above apply.

Recording/Mixing a. When recording announcers, there is to be a high level of enthusiasm in their recorded voice. There must be strong inflection and emphasis on "key" words and phrases either when giving instruction or if it is something specific that is to be retained by the trainee.

b. Announcers must have "pleasant" voices to listen to, which means speakers must not be too raspy, have a strange accent, lisp, etc.

c. Recorded passages must match the pace of the acceptable tempo. Make sure the feel of the dialogue is within the 110-152 beats per minute parameter.

d. While recording, double check for word redundancy in the script, and if present, look for alternate words. (Word redundancy will distract the listener.)

e. Record multiple takes of each section. After recording, select takes that are the most clear, easy to understand and enthusiastic.

f. When editing and mixing dialogue, keep the levels of both announcers, including high and low volume peaks, the same.

g. Compose/select music beds that best match the natural pace of the dialogue. (Follow "Rules for Music "Soundbed" Composition).

h. Mark "key" sections on the script where the music "soundbed" should change to maintain the attention of the listener. The key periods when this should occur are as follows: When a new topic is introduced; and/or when a subtopic or a section within a segment gives the trainee information in the form of a list, such as rules or steps of a task.

i. Assemble the edited dialogue segments with the music "soundbeds" carefully placed to match the natural rhythm of the dialogue.

j. Recorded dialogue is to be placed in the center of the music, as if it were the melody keeping the music level strong for greater listener impact.

k. Listen carefully to playback to make sure the music is loud enough to be heard clearly, but not too loud as to interfere with or distract from spoken dialogue. If the music feels like it is fighting with the dialogue in any part of the script, change the "soundbed"(s) to something more appropriate.

l. Confirm there are no recorded sections with one announcer speaking longer than 10 seconds when giving instructions.

m. Ensure that there is no more than 90 consecutive seconds of the same "soundbed" used for instructional underscoring.

n. "Soundbeds" volume must be set between −16 db's and −28 db's of digital zero (0).

o. "Soundbed" music to be changed at every change in subject matter p. Programs to be mastered at −3 db's @ 44.1 k, 16 or 24 bit word lengths.

Building a Logical Training Program (Audio Only)

Figure 1B:
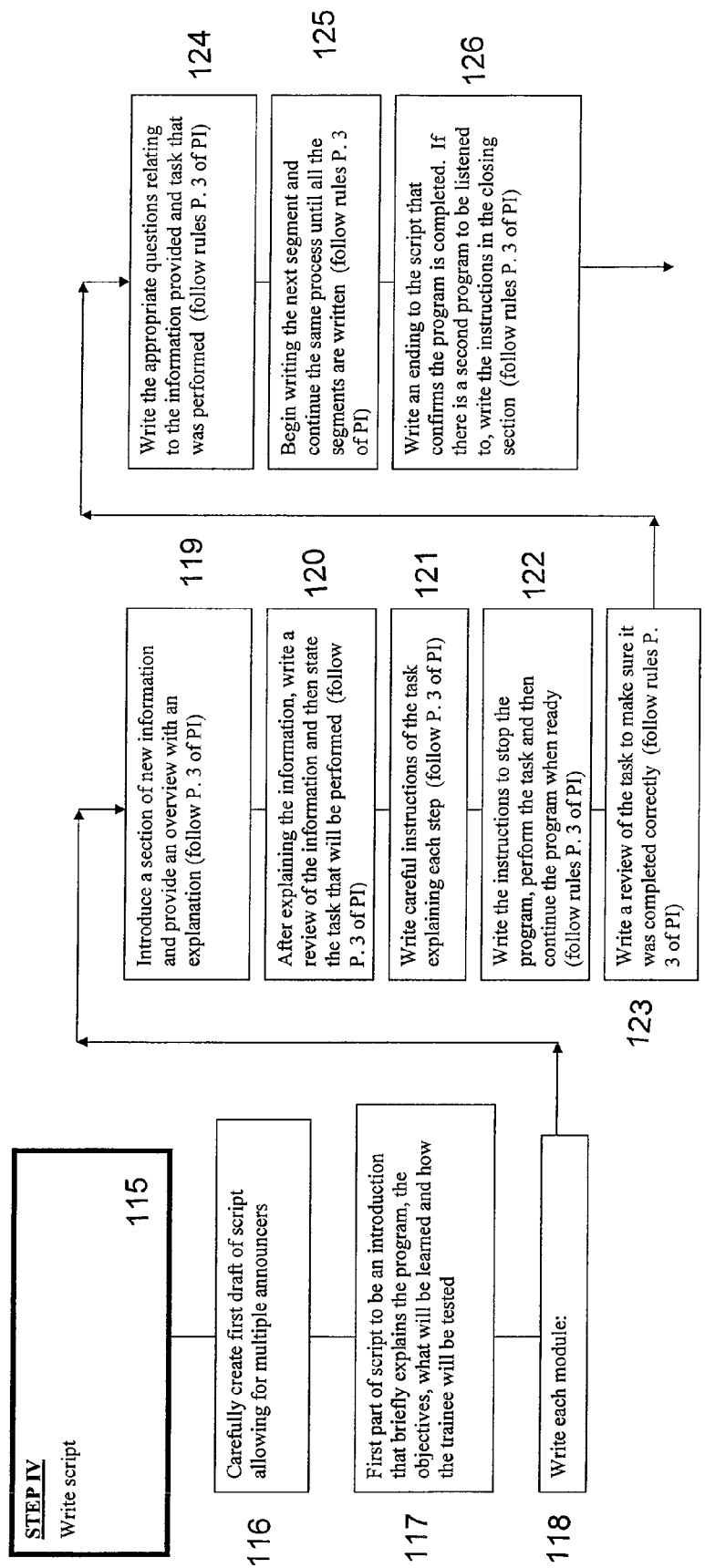
Figure 1C:
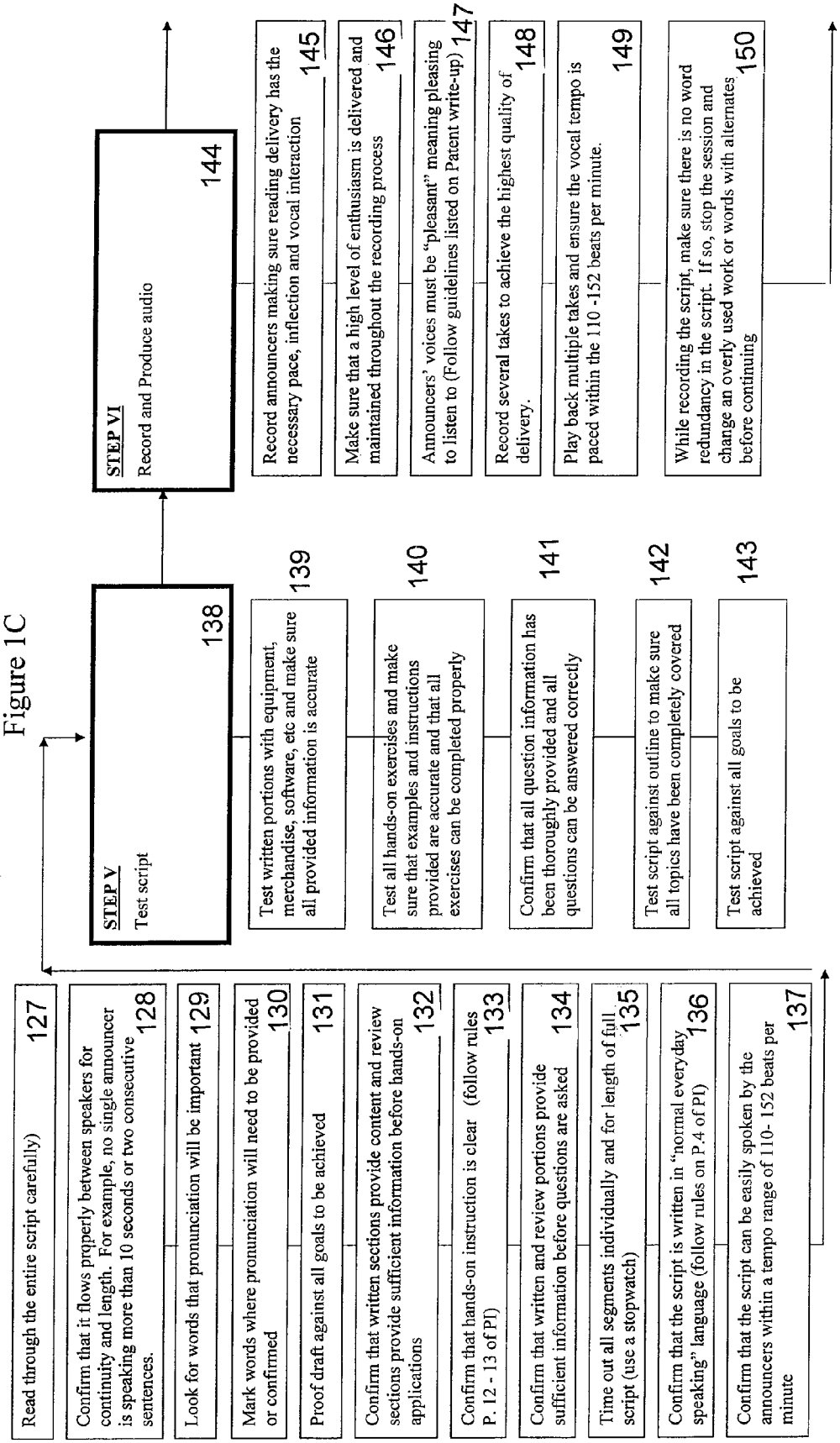
Figure 1D:
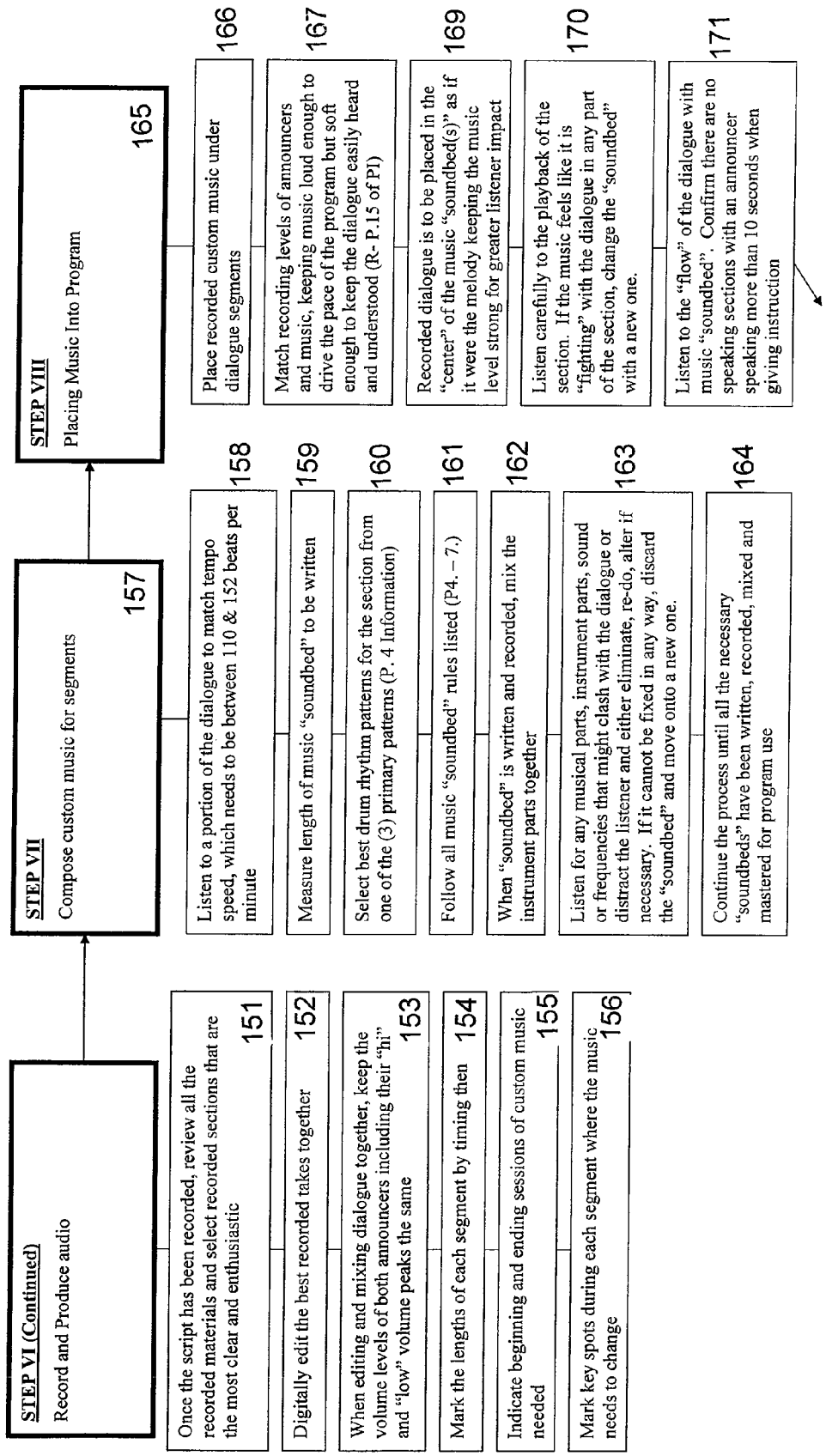
Figure 1E:
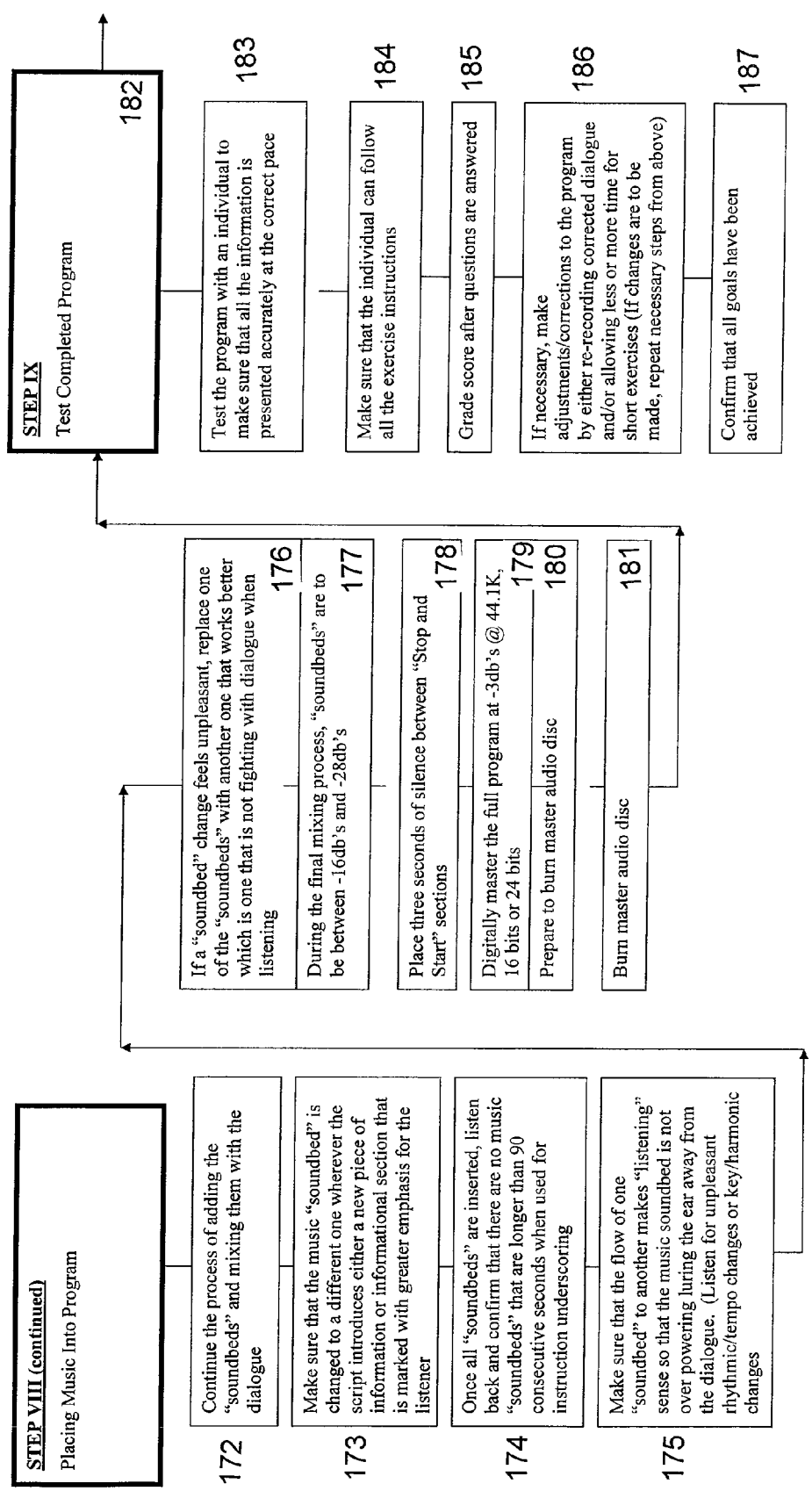
Figure 1F:
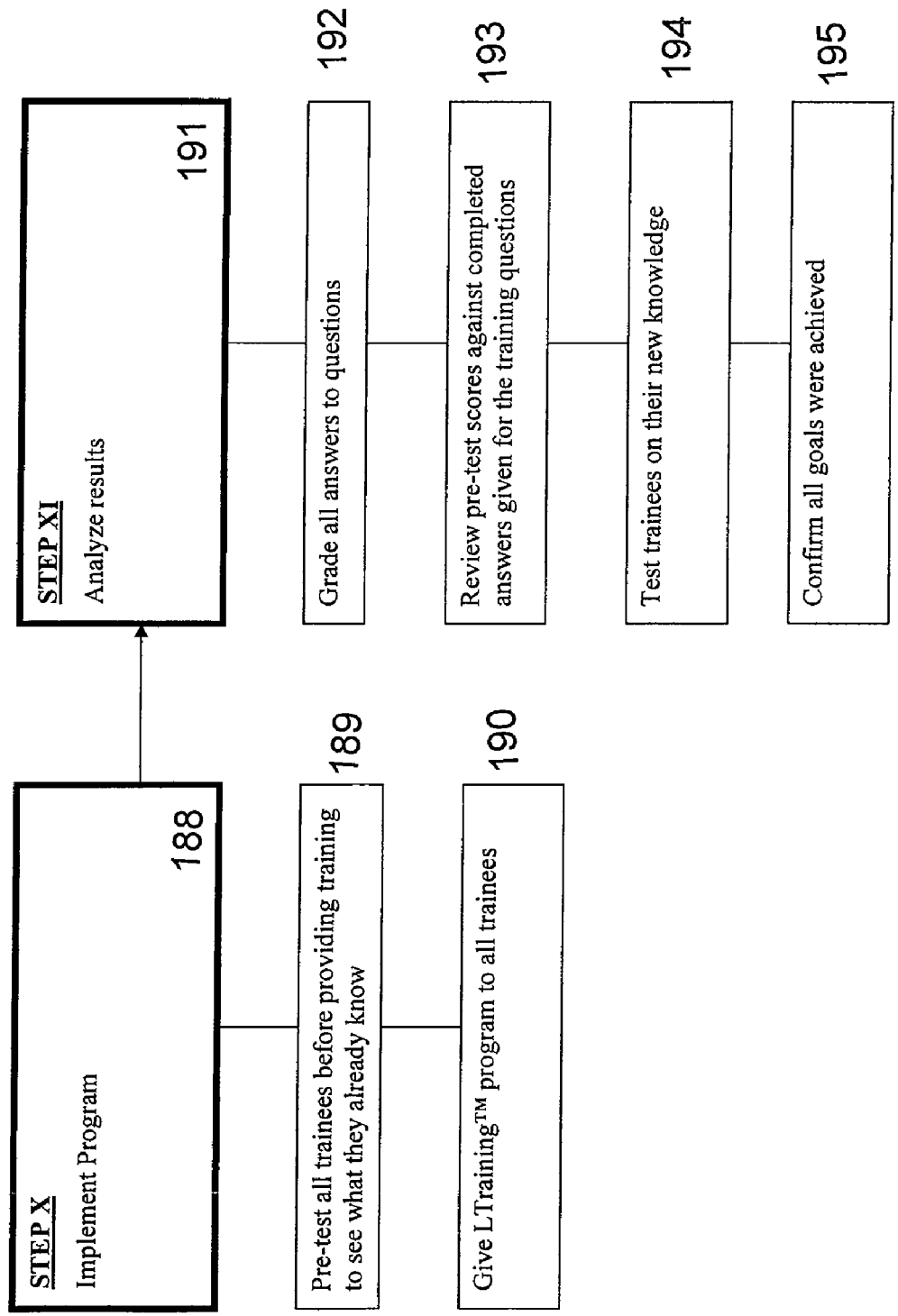

Step 1:

FIGS. 1A-1F illustrate a flowchart describing steps performed in creating an audio-based logical training program in accordance with the present invention. The steps of the preferred embodiment are as follows:

Analyze the learning objectives and goals of the program to be created (step 101):

Study the needs and information the trainee must obtain (step 102).

List opportunities for hands-on training applications (step 103).

Formulate script segments (step 104).

Approximate script segment length to make sure there is enough and/or not too much information in order to keep the segment length between three and five minutes (step 105).

Step II

Build a full outline of the script/program (step 106)

List all segments, components and hands-on opportunities (step 107).

Test outline against learning objectives (step 108).

Confirm that outline matches all goals to be achieved (step 109).

Step III

Script formulation (step 110)

Approximate segment lengths to be between three and five minutes (step 111).

Approximate exercise lengths—time out the length of time to perform task(s) (step 112).

Assess practicability of segments and exercises against goals to be achieved (step 113).

List questions to be asked during the program (step 114).

Step IV

Write script (step 115)

Carefully create first draft of script for multiple announcers (step 116).

First part of script to be an introduction that briefly explains the program, the objectives, what will be learned and how the trainee will be tested (step 117).

Write each module (step 118):

Introduce a section with new information and provide an overview with an explanation (follow time guides listed above) (step 119).

After explaining the information, write a review of the information and then state the task that will be performed (follow time guides listed above) (step 120).

Write careful instructions of the task explaining each step (follow time guides listed above) (step 121).

Write the instructions to stop the program, perform the task and then continue the program when ready (follow time guides listed above) (step 122).

Write a review of the task to make sure it was completed correctly (follow time guides listed above) (step 123).

Write in the appropriate questions relating to the information provided and task that was performed (follow time guides listed above) (step 124).

Begin writing the next segment and continue the same process until all the segments are written (follow time guides listed above) (step 125).

Write an ending to the script that confirms the program is completed. If there is a second program to be listened to, write that in the closing section (follow time guides listed above) (step 126).

Read through the entire script carefully (step 127).

Confirm that it flows properly between speakers for continuity and length. For example, no single announcer is speaking more than 10 seconds or two consecutive sentences (step 128).

Look for words in which pronunciation will be important (step 129).

Mark words where pronunciation will need to be provided or confirmed (step 130).

Proof draft against all goals to be achieved (step 131).

Confirm that written sections provide content and review sections provide sufficient information before hands-on applications (step 132).

Confirm that hands-on instruction is clear by reading it out loud to an assistant. Ask assistant follow up questions to make sure they comprehend what was needed (step 133).

Confirm that written and review portions of the script provide sufficient information before questions are asked (step 134).

Time all segments individually and for length of full script (use a stopwatch) (step 135).

Confirm that entire script is written in "normal everyday speaking" language (follow explanation listed above) (step 136).

Confirm that the script can be easily spoken by the announcers within a tempo range of 110-152 beats per minute (step 137).

Step V

Test script (step 138)

Test written portions with equipment, merchandise, software, etc., and make sure all provided information is accurate. Go through the script and perform all the tasks to make sure that all the instructions and information is correct (step 139).

Test all hands-on exercises and make sure that examples and instructions provided are accurate and that all exercises can be completed properly (step 140).

Confirm that all information regarding the questions has been thoroughly provided and that all questions can be answered correctly (step 141).

Test script against outline to make sure all topics have been thoroughly covered (step 142).

Test script against all goals to be achieved (step 143).

Step VI

Record and Produce audio (step 144)

Make sure reading delivery has the necessary pace, inflection and vocal interaction (step 145).

Make sure that a high level of enthusiasm is delivered and maintained throughout the recording process (step 146).

Announcers' voices must be "pleasant" meaning pleasing to listen to (follow guidelines listed above) (step 147).

Record several takes to achieve the highest quality of delivery (step 148).

Play back multiple takes and ensure the vocal tempo is paced within the 110-152 beats per minute (step 149).

While recording the script, make sure there is no word redundancy in the script. If so, stop the session and change any redundant word or words with alternates before continuing (step 150).

Once the script has been recorded, review all the recorded materials and select the specific takes that are the most clear and enthusiastic (step 151).

Digitally edit the best-recorded takes together ensuring a consistent and natural flow (step 152).

When editing and mixing dialogue together, keep the volume levels of both announcers including their "high" and "low" volume peaks the same (step 153).

Mark the lengths of each segment by timing them with a stopwatch or computer timer (step 154).

Indicate beginning and ending sections of custom music needed (step 155).

Mark key spots during each segment where the music needs to change (step 156).

Step VII

Compose custom music for segments (step 157)

Listen to a portion of the dialogue and match tempo speed to be between 110 and 152 beats per minute (step 158).

Measure length of music bed to be written (step 159).

Select best drum rhythm patterns for the section from one of the three primary patterns (step 160)

Follow all music "soundbed" rules listed above (step 161)

When "soundbed" is written and recorded, mix the instrument parts together down to two stereo tracks (step 162).

Listen for any musical parts, instrument parts, sounds or frequencies that might clash with the dialogue or distract the listener. If found, either eliminate, re-do or alter these sections as necessary. If it cannot be fixed in any way, discard the "soundbed" and create a new one (step 163).

Continue the process until all the necessary "soundbeds" have been written, recorded, mixed and mastered for program use (step 164).

Step VIII

Placing music into program (step 165)

Place recorded custom music under dialogue segments (step 166).

Match recording levels between announcers and music, keeping music loud enough to drive the pace of the program but soft enough for the dialogue to be easily heard and understood. This is done by starting the music level at zero and gradually increasing it until the proper level is reached. "Soundbeds" must be between −16 db's and −28 db's of digital zero (0) (step 167).

Make sure the dialogue is clearly understood while hearing the pulse of the music "soundbeds" (step 168).

Recorded dialogue is to be placed in the "center" of the music "soundbed(s)" as if it were the melody keeping the music level strong for greater listener impact (step 169).

Listen carefully to the playback of the section. If the music feels like it is "fighting" with the dialogue in any part of the section, change the "soundbed" with a new one (step 170).

Listen to the "flow" of the dialogue with music "soundbed". Confirm there are no speaking sections with an announcer speaking more than 10 seconds when giving instruction (step 171).

Continue the process of adding the "soundbeds" and mixing them with the dialogue; repeat as needed until desired mix is achieved (step 172).

Make sure that the music "soundbed" is changed where the script introduces a new piece of information or an informational section that is marked with greater emphasis for the listener (step 173).

Once all "soundbeds" are inserted, listen back and confirm that there are no music "soundbeds" that are longer than 90 consecutive seconds when used for instruction underscoring (step 174).

Make sure that the flow of one "soundbed" to another makes 'musical' sense so that the "soundbed" transition is not overpowering, distracting from the dialogue. (Listen for unpleasant rhythmic/tempo changes or key/harmonic changes) (step 175).

If a "soundbed" change feels unpleasant, replace one of the "soundbeds" with another one that transitions without distracting from the dialogue while listening (step 176).

During the final mixing process, "soundbeds' are to be between −16 db's and −28 db's of digital 0 (step 177).

Place three seconds of silence between "Stop and Start" sections (step 178).

Digitally master the full program at −3 db's @ 44.1K, 16 or 24 bit word lengths (step 179)

Prepare to burn master audio disc (step 180).

Burn master audio disc (step 181).

Step IX

Test completed program (step 182)

Test the program with an individual to make sure that all the information is presented accurately and at the correct pace (step 183).

Make sure that the individual can follow all the exercise instructions (step 184).

Grade score after questions are answered (step 185).

If necessary, make adjustments/corrections to the program by either re-recording corrected dialogue and/or allowing less or more time for short exercises (If changes are to be made, repeat necessary steps from above) (step 186).

Confirm that all goals have been achieved (step 187).

Step X

Implement program (step 188)

Pre-test all trainees before providing training to see what they already know (step 189).

Give logical training program to all trainees (step 190).

Step XI
　Analyze results (step 191)
　Grade all answers to questions (step 192).
　Review pre-test scores against completed answers given for the training questions (step 193).
　Test trainees on their new knowledge (step 194).
　Confirm all goals were achieved (step 195).

Building a Logical Training Program (PC Based)

Figure 2A:
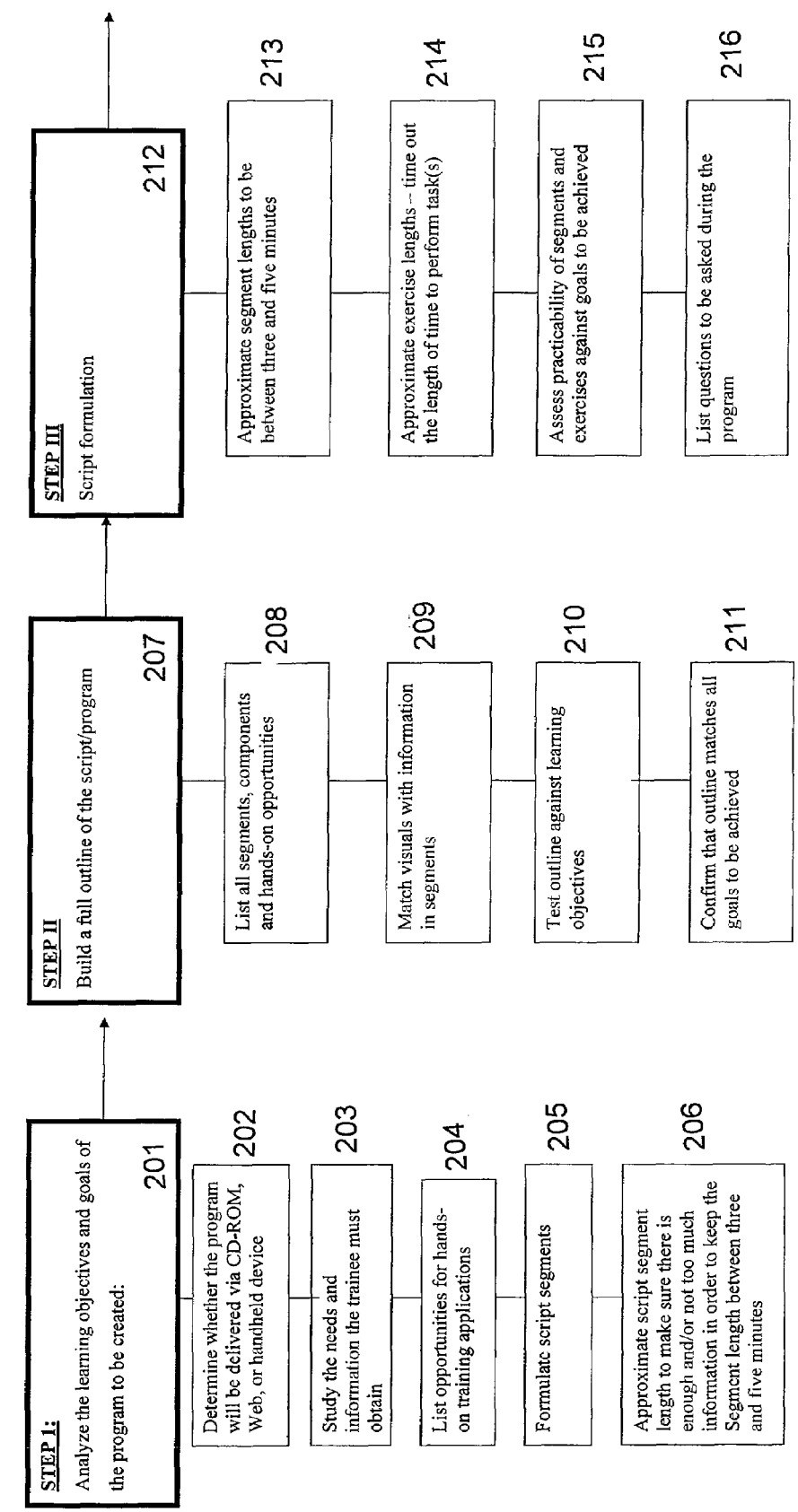
FIGS. 2A-2G illustrate a flowchart describing steps performed in creating a PC-based logical training program in accordance with the present invention.
Figure 2B:
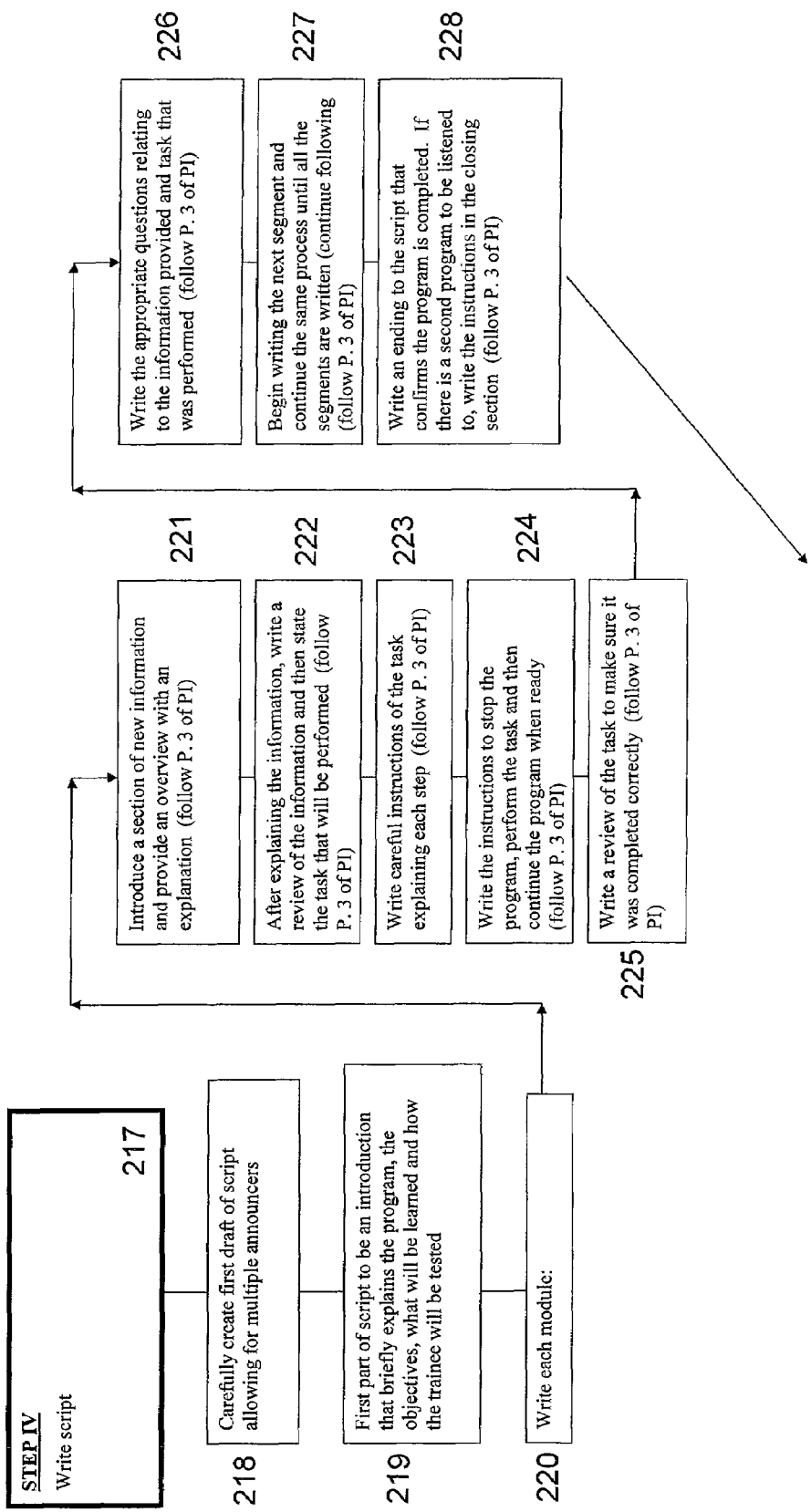
Figure 2C:
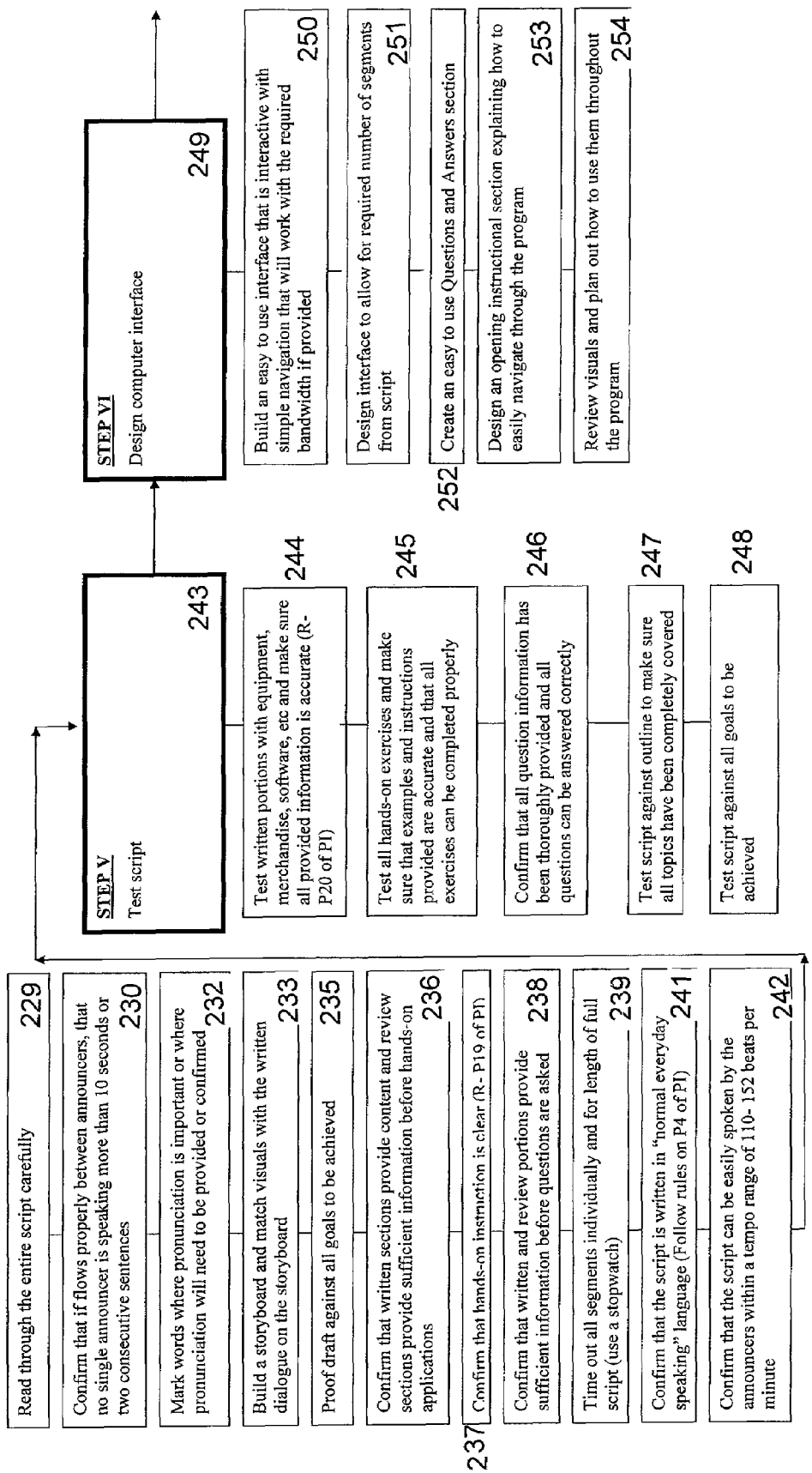
Figure 2D:
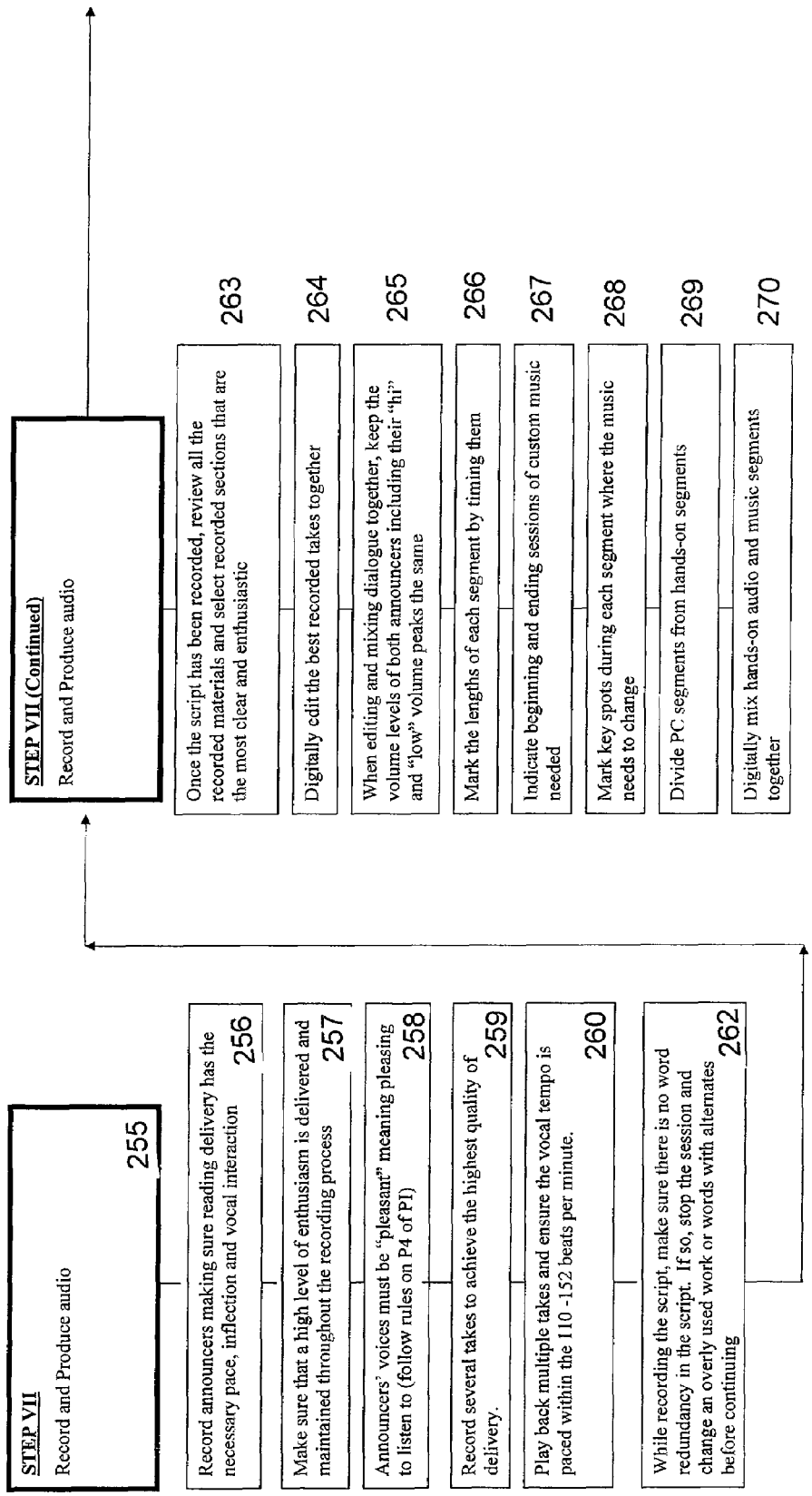
Figure 2E:
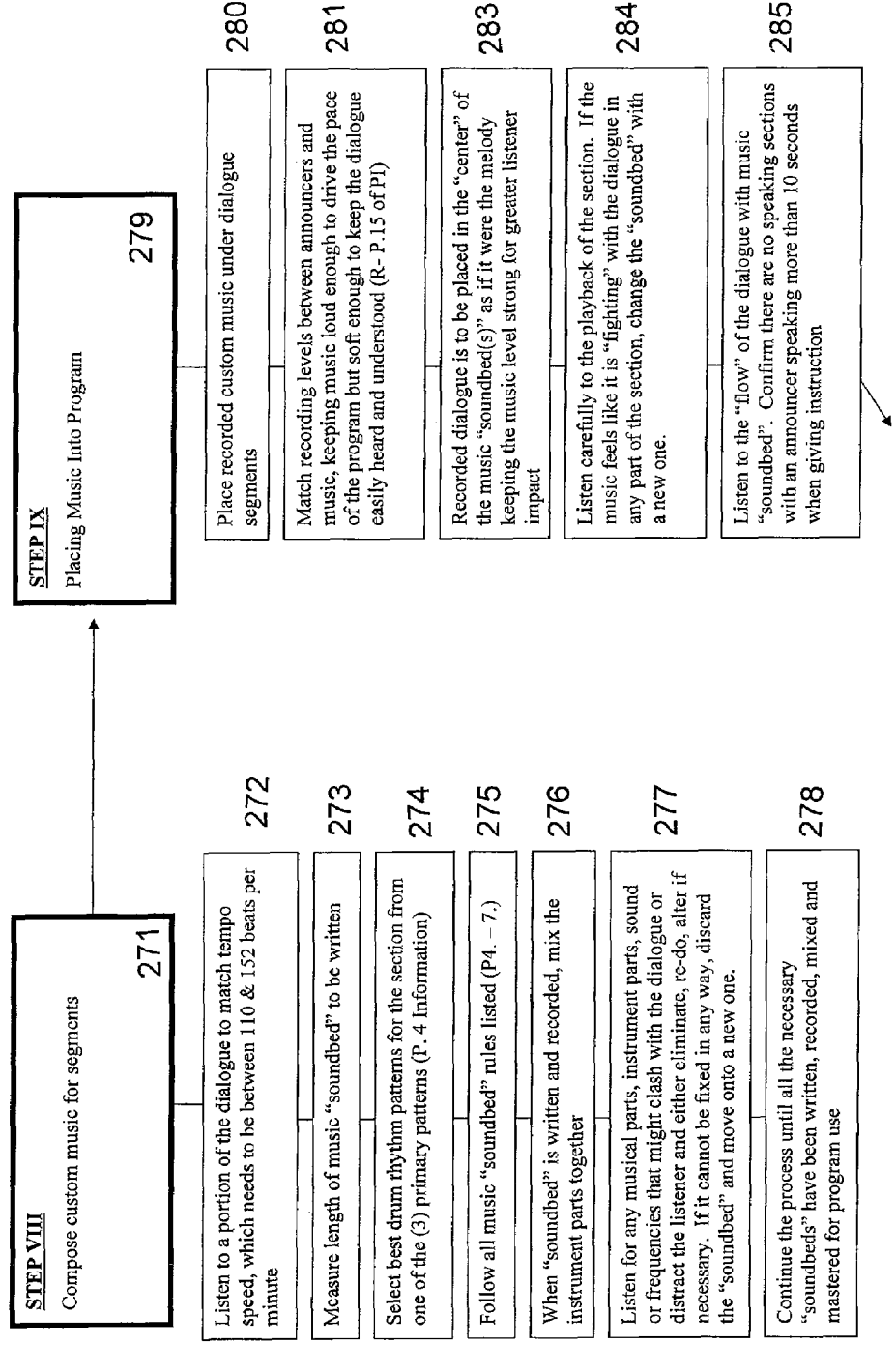
Figure 2F:
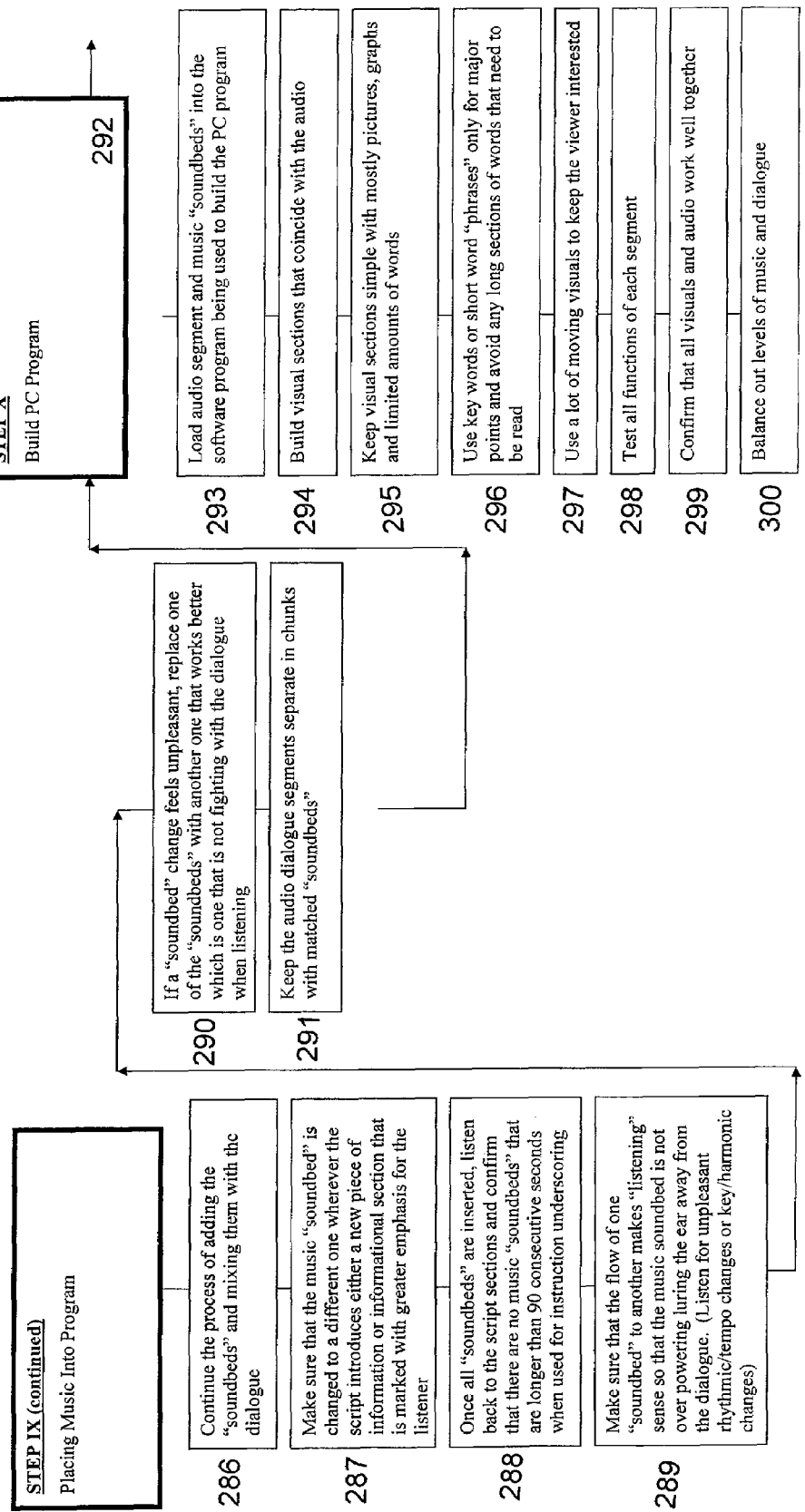
Figure 2G:
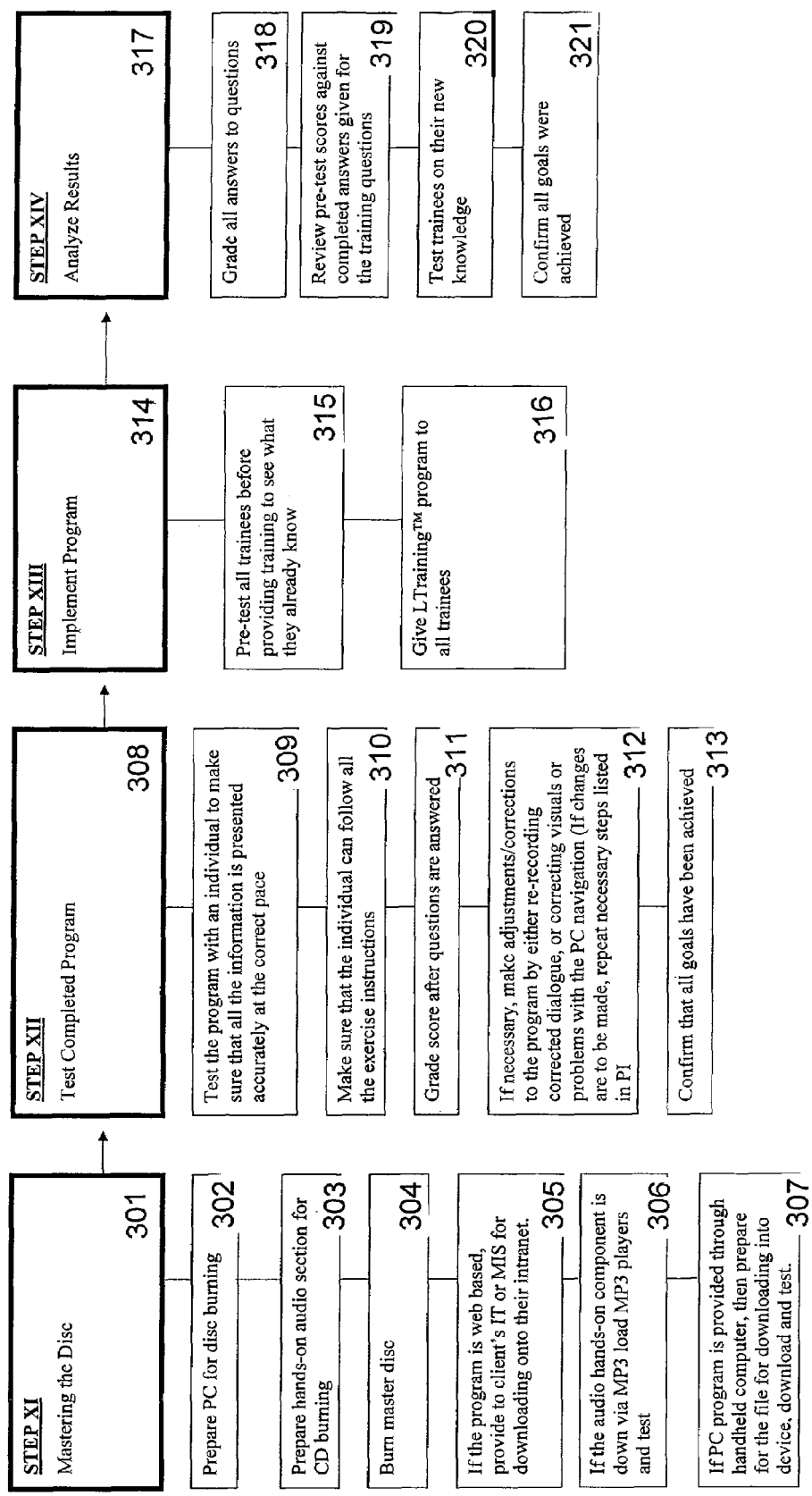

Step I:
　FIGS. 2A-2G illustrate a flowchart describing steps performed in creating a PC-based logical training program in accordance with the present invention. The steps of a preferred embodiment are as follows:
　Analyze the learning objectives and goals of the program to be created (step 201):
　　Determine whether the program will be delivered via CD-ROM, Web, or handheld device (step 202).
　　Study the needs and information the trainee must obtain (step 203).
　　List opportunities for hands-on training applications (step 204).
　　Formulate script segments (step 205).
　　Approximate script segments length to make sure there is enough and/or not too much information in order to keep the segment length between three and five minutes (step 206).

Step II
　Build a full outline of the script/program (step 207)
　List all segments, components and hands-on opportunities (step 208).
　Match visuals with information in segments (step 209).
　Test outline against learning objectives (step 210).
　Confirm that outline matches all goals to be achieved (step 211).

Step III
　Script formulation (step 212)
　Approximate segment lengths to be between three and five minutes (step 213).
　Approximate exercise lengths—time out the length of time to perform task(s) (step 214).
　Assess practicability of segments and exercises against goals to be achieved (step 215).
　List questions to be asked during the program (step 216).

Step IV
　Write script (step 217)
　Carefully create first draft of script for multiple announcers (step 218).
　First part of script to be an introduction that briefly explains the program, the objectives, what will be learned and how the trainee will be tested (step 219).
　Write each module (step 220):
　　Introduce a section with new information and provide an overview with an explanation (follow time guides listed above) (step 221).
　　After explaining the information, write a review of the information and then state the task that will be performed (follow time guides listed above) (step 222).
　　Write careful instructions of the task explaining each step (follow time guides listed above) (step 223).
　　Write the instructions to stop the program, perform the task and then continue the program when ready (follow time guides listed above) (step 224).
　　Write a review of the task to make sure it was completed correctly (follow time guides listed above) (step 225).
　　Write the appropriate questions relating to the information provided and task that was performed (follow time guides listed above) (step 226).
　　Begin writing the next segment and continue the same process until all the segments are written (continue following time guides listed above) (step 227).
　　Write an ending to the script that confirms the program is completed. If there is a second program to be listened to, write that in the closing section (follow time guides listed above) (step 228).
　Read through the entire script carefully (step 229).
　Confirm that it flows properly between speakers for continuity and length. For example, no single announcer is speaking more than 10 seconds or two consecutive sentences (step 230).
　Look for words in which pronunciation will be important (step 231). For example, when scripts are written there are often words that are used that are directly related to the specific training being conducted. Teaching a store associate about cookware might require the use of the brand name "Calphalon®". Word such as these are identified prior to the recording session to make certain they are pronounced correctly and consistently by all of the announcers. Geographic sensitivity may also be an issue in pronunciation, for example, someone from Boston may not pronounce the word "Market" the way it is pronounced in New Jersey. So if a training program is being produced that will be used only in Massachusetts only, it may be desirable to have the announcers use the "Boston" pronunciation of certain words.
　Mark words where pronunciation will need to be provided or confirmed (step 232).
　Build a storyboard (step 233).
　Match visuals with the written dialogue on the storyboard (step 234).
　Proof draft against all goals to be achieved (step 235).
　Confirm that written/visual and review portions provide sufficient information before hands-on applications (step 236).
　Confirm that hands-on instruction is clear by reading it out loud to an assistant. Ask the assistant follow up questions to make sure they comprehended what was needed (step 237).
　Confirm that written/visual and review portions of the storyboard/script provide sufficient information before questions are asked (step 238).
　Time all segments individually and for length of full script (use a stopwatch) (step 239).
　Confirm that hands-on portion flows properly with PC segments (step 240). For example, using the cookware example, assume that the trainee saw a segment on the PC that explained the metals used in a frying pan and discussed the different gauge levels of the metals. During the hands-on training, it would be desirable when the trainee is holding the frying pan to remind them to examine the texture of the metal, feel the weight and see if they can figure what type of metal was used and what the gauge was.
　Confirm that the entire script, both PC portion and audio only portion, is written in "normal everyday speaking" language (follow explanation listed above) (step 241).
　Confirm that the entire script, both PC portion and audio only portion can be easily spoken by the announcers within a tempo range of 110-152 beats per minute (step 242).

Step V
  Test script (step 243)
    Test written portions with equipment, merchandise, software, etc., and make sure all provided information is accurate. Go through the script and perform all the tasks to make sure that all the instructions and information is correct (step 244).
    Test all hands-on exercises and make sure that examples and instructions provided are accurate and that all exercises can be completed properly (step 245).
    Confirm that all information regarding the questions has been thoroughly provided and that all questions can be answered correctly (step 246).
    Test script against outline to make sure all topics have been thoroughly covered (step 247).
    Test script against all goals to be achieved (step 248).

Step VI
  Design computer interface (step 249)
    Build an easy to use interface that is interactive with simple navigation (step 250).
    Design interface to allow for required number of segments from script (step 251).
    Create an easy to use Questions and Answers section (step 252).
    Design an opening instructional section explaining how to easily navigate through the program (step 253).
    Review visuals and plan out how to use them throughout the program (step 254).

Step VII
  Record and Produce audio (step 255)
    Make sure reading delivery has the necessary pace, inflection and vocal interaction (step 256).
    Make sure that a high level of enthusiasm is delivered and maintained throughout the recording process (step 257).
    Announcer's voices must be "pleasant" meaning pleasing to listen to (follow time guides listed above) (step 258).
    Record several takes to achieve the highest quality of delivery (step 259).
    Play back multiple takes and ensure the vocal tempo is paced within the 110-152 beats per minute (step 260).
    Record several takes to achieve the highest quality of delivery (step 261). The delivery of the information is very important. Therefore when recording the script, it is done in sections and the announcers record each section several times making sure that there are multiple takes. When the session is over, the recorded sections are listened to and the ones that are the best are selected, that is, those offering the best delivery, enthusiasm, clarity, etc.
    While recording the script, make sure there is no word redundancy in the script. If so, stop the session and change any redundant word or words with alternates before continuing (step 262).
    Once the script has been recorded, review all the recorded materials and select the specific takes that are the most clear and enthusiastic (step 263)
    Digitally edit the best recorded takes together ensuring a consistent and natural flow (step 264)
    When editing and mixing dialogue together, keep the volume levels of both announcers including their "high" and "low" volume peaks the same (step 265)
    Mark the lengths of each segment by timing them with a stopwatch or computer timer (step 266)
    Indicate beginning and ending sections of custom music needed (step 267)
    Mark key spots during each segment where the music needs to change (step 268)
    Divide PC segments from hands-on segments (step 269)
    Digitally mix hands-on audio and music segments together (step 270)

Step VIII
  Compose custom music for segments (step 271)
    Listen to a portion of the dialogue and match tempo speed which needs to be between 110 and 152 beats per minute (step 272)
    Measure length of music bed to be written (step 273)
    Select best drum rhythm patterns for the section from one of the three primary patterns described above (step 274)
    Follow all music "soundbed" rules listed above (step 275)
    When "soundbed" is written and recorded, mix the instrument parts together (step 276)
    Listen for any musical parts, instrument parts, sounds or frequencies that might clash with the dialogue or distract the listener. If found, either eliminate, re-do or alter these sections as necessary. If it cannot be fixed in any way, discard the "soundbed" and create a new one (step 277)
    Continue the process until all the necessary "soundbeds" have been written, recorded, mixed and mastered for program use (step 278)

Step IX
  Placing music into program (step 279)
    Place recorded custom music under dialogue segments (step 280)
    Match recording levels between announcers and music, keeping music loud enough to drive the pace of the program but soft enough for the dialogue to be easily heard and understood. This is done by starting the music level at zero and gradually increasing it until the proper level is reached. "Soundbeds" must be between −16 db's and −28 db's (step 281)
    Make sure the dialogue is clearly understood while hearing the pulse of the music "soundbeds" (step 282). After everything is recorded and mixed together (meaning the dialogue and soundbeds), it is desirable to be sure that the levels of both the music and dialogue are optimal. Should the music be too loud, it will drown out the narration. By listening carefully and adjusting the faders (volume controls) of both the narration and music an optimal balance between both can be achieved. The music needs to be loud enough to provide the energy necessary to keep the trainee engaged in the program but the music needs to be low enough to not pull away the listening attention of the trainee from the narration to the music.
    Recorded dialogue is to be placed in the "center" of the music "soundbed(s)" as if it were the melody keeping the music level strong for greater listener impact (step 283)
    Listen carefully to the playback of the section. If the music feels like it is "fighting" with the dialogue in any part of the section, change the "soundbed" with a new one (step 284).
    Listen to the "flow" of the dialogue with music "soundbed". Confirm there are no speaking sections with an announcer speaking more than 10 seconds when giving instruction (step 285).
    Continue the process of adding the "soundbeds" and mixing them with the dialogue (step 286)
    Make sure that the music "soundbed" is changed to a different one where the script introduces either a new piece of information or an informational section that is marked with greater emphasis for the listener (step 287)

Once all "soundbeds" are inserted, listen back to the script sections and confirm that there are no music "soundbeds" that are longer than 90 consecutive seconds when used for instruction underscoring (step 288)

Make sure that the flow of one "soundbed" to another makes "musical" sense so that the music soundbed "transition" is not over powering, distracting the ear away from the dialogue. (Listen for unpleasant rhythmic/tempo changes or key/harmonic changes) (step 289)

If a "soundbed" change feels unpleasant, replace one of the "soundbeds" with another one that works better which is one that transitions without distracting dialogue while listening (step 290)

Keep the audio dialogue segments separate in chunks with matched "soundbeds" (step 291)

Step X
Build PC Program (step 292)
Load audio segments and music "soundbeds" into the software program being used to build the PC program (step 293).
Build visual sections that coincide with and reinforce the audio information (step 294).
Keep visual sections simple with pictures, graphs and limited amounts of words (step 295).
Use key words or short word "phrases" only for major points and avoid any long sections of words that need to be read (step 296).
Use lots of movement with the visuals to keep the viewer interested (step 297).
Test all functions of each segment (step 298).
Confirm that all visuals and audio work well together (step 299).
Balance out levels of music and dialogue (step 300).

Step XI
Mastering the disc (step 301)
Prepare PC for disc burning (step 302)
Prepare hands-on audio section for CD burning (step 303)
Burn master disc (step 304)
If the program is web based, provide to client's IT or MIS for downloading onto their intranet (step 305).
If the audio hands-on component is downloaded via MP3, load MP3 players and test (step 306).
If PC program is provided through handheld computer, prepare the file for downloading into device, download and test (step 307).

Step XII
Test completed program (step 308)
Test the program with an individual to make sure that all the information is presented accurately and at the correct pace (step 309).
Make sure that the individual can follow all the exercise instructions (step 310).
Grade score after questions are answered (step 311).
If necessary, make adjustments/corrections to the program by either re-recording corrected dialogue, or correcting visuals or problems with the PC navigation (If changes are to be made, repeat necessary steps from above) (step 312).
Confirm that all goals have been achieved (step 313).

Step XIII
Implement program (step 314)
Pre-test all trainees before providing training to see what they already know (step 315).
Give logical training program to all trainees (step 316).

Step XIV
Analyze results (step 317)
Grade all answers to questions (step 318).
Review pre-test scores against completed answers given for the training questions (step 319).
Test trainees on their new knowledge (step 320).
Confirm all goals were achieved (step 321).

What follows is an example of using the logical training method of the present invention to teach product knowledge in a retail store. For this example, cookware is the product category for which training is going to be given to a trainee, using the headset method described above.

The trainee will stand in the cookware department of the store wearing the headset and begin listening to a logical training program. First the trainee will hear instructions on how to use the program. The narrators will give instructions on how to use the device they are using to listen to the program. Once completed, the narrators will begin to give the trainee an overview of the products and key points of the cookware department. For example the narrators could explain to the trainee what is in the cookware department, discussing the elements that make up pots and pans.

Next, the trainee will hear specific instructions to pick up a particular item and study it while the narrators point out key characteristics such as the handle, metal gauge or other important elements the trainee will need to know. The program will continue with several specific requests from the narrators for the trainee to perform various functions and exercises to better understand what they are learning. Throughout the program there will be review sections and quiz questions to be answered by the trainee.

Finally, when all the information about the products has been explained to the trainee, the narrators will then teach the trainee how to use that information with a customer. The narrators will reinforce the "customer service" steps of greeting the customer and asking questions and will provide the trainee with the types of questions they should ask and prepare them for the types of questions most customers are likely to ask them. A complete "How to sell Cookware" example is provided by the narrators for the trainee to understand how the information they have learned is used and continues until the trainee hears about "add-on" selling and closing the sale which for most retailers includes "thanking the customer by name."

Once the trainee has completed the entire program he or she returns the device to their manager along with their answers to the quiz questions. When questions are on the program as in this example of a Cookware Product Knowledge Program, the retailer would typically be provided with an "Answer Sheet" for the trainee to circle the correct answer to the question. The "Answer Sheet" could be numbered 1-10 with each number having letters A, B, & C. While listening to the program, the narrators ask the trainee questions that have to be answered. The trainee circles the correct letter for each question. The questions are never on the "Answer Sheet."

While there has been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

What is claimed is:

1. An insitu training method, said method comprising:
providing a portable device for generating audio signals;
providing a media storage device, readable by said portable device, containing instructions for generating an audio training segment by said portable device, said audio training segment comprising pre-recorded, spoken instructions relevant to performing a task within a given environment, and background music, said spoken instructions including an instruction to stop the playing of said audio training segment and perform a specific exercise before resuming playing of said audio training segment and further wherein said spoken instructions comprise a recording of at least two announcers alternately reading a pre-prepared script structured such that each of said announcers only reads for a maximum of ten seconds per turn, and wherein said recording is mixed such that the high peak audio levels of each of said announcers reading is substantially equal;

listening to said audio training segment, by a trainee using said portable audio device and said media storage device, while in said environment;

stopping playing of said audio training segment, by said trainee, while in said environment;

performing said, specific exercise by said trainee, while in said environment; and resuming playing and listening to said training segment, by said trainee, while in said environment and after completing performing said specific exercise;

wherein said background music is synchronized with said reading of said pre-prepared script such that the beat of said background music changes from less than 132 beats per minute to more than 132 beats per minute, or vice versa, when said script introduces a new topic.

2. The method of claim 1 wherein said recording is mastered at with one of 16 or 24 bit word length at a sample rate of 44.1 k hertz.

3. The method of claim 2 wherein said background music is recorded to have an audio level of between −16 db's and −28 db's with respect to digital zero.

4. The method of claim 1 wherein said background music has a beat in the range of 110-152 beats per minute.

5. The method of claim 4 wherein said beat changes at least once every 90 seconds.

6. The method of claim 1 further comprising testing said trainee's learning comprising providing one or more audio questions, and providing an answer sheet devoid of any representation of said audio questions but wherein said answer sheet comprises numbers and letters arranged to allow said trainee to record a written answer to each of said one of more audio questions.

* * * * *